(12) United States Patent
Tanner

(10) Patent No.: US 6,923,298 B2
(45) Date of Patent: *Aug. 2, 2005

(54) SHOCK, VIBRATION AND ACOUSTIC ISOLATION SYSTEM

(75) Inventor: Edward T. Tanner, Williamsburg, VA (US)

(73) Assignee: Northrop Grumman Corporation, Los Angeles, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/850,209

(22) Filed: May 20, 2004

(65) Prior Publication Data

US 2004/0212132 A1 Oct. 28, 2004

Related U.S. Application Data

(63) Continuation of application No. 09/963,566, filed on Sep. 27, 2001, now Pat. No. 6,752,250.

(51) Int. Cl.[7] ................................................. F16F 15/03
(52) U.S. Cl. ................. 188/267; 188/267.1; 188/267.2; 188/64.28; 188/136
(58) Field of Search .............................. 188/267, 267.1, 188/267.2; 267/64.11–64.28, 136, 131, 140.14, 140.15

(56) References Cited

U.S. PATENT DOCUMENTS

| | | | |
|---|---|---|---|
| 3,737,155 A | 6/1973 | Karlan | |
| 3,807,678 A | 4/1974 | Karnopp et al. | |
| 4,468,739 A | 8/1984 | Woods et al. | |
| 4,679,775 A | 7/1987 | Funaki et al. | |
| 4,781,363 A | 11/1988 | Braun | |
| 4,858,733 A | 8/1989 | Noguchi et al. | |
| 4,887,699 A | 12/1989 | Ivers et al. | |
| 5,091,679 A | 2/1992 | Murty et al. | |
| 5,277,281 A | 1/1994 | Carlson et al. | |
| 5,366,048 A | 11/1994 | Watanabe et al. | |
| 5,396,973 A | 3/1995 | Schwemmer et al. | |
| 5,398,785 A | 3/1995 | Leitmann et al. | |
| 5,449,150 A | 9/1995 | Watanabe et al. | |
| 5,454,451 A | 10/1995 | Kawamata et al. | |
| 5,458,217 A | 10/1995 | Ohishi | |
| 5,492,312 A | 2/1996 | Carlson | |
| 5,582,385 A | 12/1996 | Boyle et al. | |
| 5,652,704 A | 7/1997 | Catanzarite | |
| 5,802,966 A | 9/1998 | Schoch | |
| 5,848,663 A | 12/1998 | Kuriki | |
| 5,876,012 A | 3/1999 | Haga et al. | |
| 5,884,736 A | 3/1999 | Burdisso et al. | |
| 5,964,455 A | 10/1999 | Catanzarite et al. | |
| 6,019,201 A | 2/2000 | Gordaninejad et al. | |
| 6,021,991 A | 2/2000 | Mayama et al. | |
| 6,082,715 A | 7/2000 | Vandermolen | |
| 6,123,312 A | 9/2000 | Dai | |
| 6,327,024 B1 | 12/2001 | Hayashi et al. | |
| 6,382,369 B1 | 5/2002 | Lisenker | |

OTHER PUBLICATIONS

Delphi—Damping Systems—MagneRide™ (Description of Product); Dec., 2002, Delphi Energy & Chassis Systems, Troy MI.

Primary Examiner—Robert A. Siconolfi
(74) Attorney, Agent, or Firm—Hunton & Williams LLP

(57) ABSTRACT

A shock and vibration isolation system for mounting equipment to a base wall uses a semi-active damper in parallel with a spring arrangement to provide optimum isolation with respect to both shock and vibration. The system comprises a load plate configured for attachment of the equipment thereto and a base plate configured for attachment to the base wall. The base plate is substantially parallel to the load plate with a spring arrangement disposed intermediate the load plate and the base plate. The spring arrangement engages the load plate and the base plate to bias the load plate and the base plate in a separated relationship. The system also comprises a damping arrangement disposed intermediate the load plate and the base plate. The damping arrangement is adapted for providing a selectively variable reaction force to the load plate and the base plate responsive to a relative displacement of the load plate with respect to the base plate.

47 Claims, 10 Drawing Sheets

SHOCK, VIBRATION AND ACOUSTIC ISOLATION SYSTEM

RELATED APPLICATIONS

This application is a continuation of application Ser. No. 09/963,566, filed Sep. 27, 2001 now U.S. Pat. No. 6,752,250 this application is also related to U.S. application Ser. No. 10/662,731, filed Sep. 15, 2003.

FIELD OF THE INVENTION

The present invention relates generally to isolation systems used to support and protect sensitive equipment installed on an aircraft, ship, or submarine and more particularly to an isolation system that protects such equipment against shock and vibration and also minimizes the transmission of acoustic energy from the isolated equipment to the supporting structure.

BACKGROUND OF THE INVENTION

Traditionally, the U.S. Government and other governments have required that electronic equipment and other sensitive equipment used aboard military vessels, such as aircraft, ships, and submarines, be specifically designed and manufactured so as to withstand these vessels' challenging operational environments. Accordingly, suppliers have been required to specially "ruggedize" or "militarize" equipment in order to satisfy certain testing criteria, such as shock testing and/or vibration testing.

Unfortunately, such militarized equipment has two significant drawbacks. First, specially designing each piece of equipment to withstand challenging operational environments can impose significant costs. Second, because each piece of equipment must be specially designed to meet testing criteria, the deployment of state-of-the-art technologies can be significantly delayed. For instance, an improved flat screen display technology may be readily available for commercial applications, but it may be years before the technology can be incorporated into military equipment.

As a result of these and other drawbacks of so-called "MIL-SPEC" equipment, since the early 1990's the Department of Defense has issued various directives permitting and, in fact, encouraging, utilization of so-called "commercial-off-the-shelf" (COTS) technology. As a result, military vessels have been increasingly using COTS electronic components and systems in lieu of militarized equipment. COTS equipment is cheaper, it offers the latest technology, and in many instances, it offers a larger pool of suppliers from which the Government (or its prime contractors) can select.

One challenge presented by COTS equipment, however, relates to its ability to pass shock and vibration requirements. Militarized equipment has traditionally been rigidly mounted to shipboard structures. However, COTS equipment tends to have limited capabilities to withstand shock and vibration motions, and, therefore, tends to be unsuitable for being rigidly mounted to shipboard structures. Therefore, COTS equipment usually requires isolation devices (shock mounts) to mitigate the effects of shock and vibration presented in the operational environment. For example, COTS equipment is often placed in component racks that are coupled to a vessel structure (e.g., a floor or a wall) via one or more shock absorption mounts. Alternatively, individual pieces of equipment may be coupled directly to the vessel structure via shock absorption mounts. In other instances, COTS equipment may be placed on flat platforms that, in turn, are coupled to the vessel structure using shock absorption mounts.

The design of the shock absorption mounts used to protect COTS equipment runs into the inherent difficulty of designing into a single isolator the ability to perform equally well as a shock isolator and a vibration isolator. This problem arises due to the fact that a good vibration isolator tends to be a poor shock isolator and a good vibration isolator tends to be a poor shock isolator. Most attempts to solve the combined isolation problem with a passive device have met with limited success, particularly in shipboard isolation applications where many inputs are often present simultaneously. The typical approach to solving the shipboard isolation problem involves the use of a combination of separate passive isolators for shock and vibration. This inevitably leads to modifying vibration isolators to survive shock inputs and/or modifying shock isolators to perform adequately as vibration isolators. Other environments present similar design difficulties.

Another problem presented to the designer is that the damping mechanism used in a shock isolation system must provide a force that is matched to the mass of the equipment being isolated. When equipment is changed out or modified, the isolation system must be changed to reflect changes in mass and mass distribution. Given the frequency of equipment change-out and upgrades, this is a significant drawback.

SUMMARY OF THE INVENTION

The present invention provides an ideal solution in the form of a single self-contained isolation system that provides both effective vibration isolation in the 10 to 200 Hz range and shock isolation from a variety of inputs such as underwater explosions, wave slap, impact, etc. The system also provides acoustic isolation of the base structure to which sensitive equipment is mounted.

An embodiment of the present invention provides a shock and vibration isolation system for mounting equipment to a base wall. The system comprises a load plate configured for attachment of the equipment thereto and a base plate configured for attachment to the base wall. The base plate is substantially parallel to the load plate with a spring arrangement disposed intermediate the load plate and the base plate. The spring arrangement engages the load plate and the base plate to bias the load plate and the base plate in a separated relationship. The system also comprises a damping arrangement disposed intermediate the load plate and the base plate. The damping arrangement is adapted for providing a selectively variable reaction force to the load plate and the base plate responsive to a relative displacement of the load plate with respect to the base plate.

The damping arrangement of an isolation system embodiment according to the present invention may include at least one semi-active damper operatively connected to the base plate and the load plate. The at least one semi-active damper may be a magnetorheological fluid or an electrorheological fluid damper. The damping arrangement may further include a damper controller operatively connected to the at least one semi-active damper for controlling the reaction force applied to the load plate and the base plate.

The damper controller may include an optimum damper force determination module configured for determining from real time data the relative displacement of the load plate and a relative velocity of the load plate with respect to the base plate. The damper controller may also be configured for determining an optimum reaction force based on the relative displacement and relative velocity. The controller may include a current driver operatively connected to the at least one semi-active damper for selectively supplying current to energize the at least one semi-active damper. The controller may include a damper force control module in communication with the optimum force determination module and the current driver.

The damper force control module may be adapted for controlling the supply of current to the at least one semi-active damper according to a predetermined control algorithm. The control algorithm may be selected from the group consisting of clipped optimal control, Lyapunov stability theory, decentralized bang-bang control, and modulated homogeneous friction control.

The optimum reaction force determination module of an isolation system embodiment of the invention may comprise a programmable digital processor having optimum force determination software configured for calculating the optimum reaction force using a set of one or more adjustable gains. The programmable digital processor may also have gain adjustment software configured for determining a mass of the equipment based on the relative displacement and for adjusting the set of one or more adjustable gains based on the determined mass. The optimum force determination module may comprise field replaceable analog circuitry adapted for providing the optimum reaction force.

The spring arrangement of an isolation system embodiment according to the invention may have a natural frequency in a range from about 1.0 Hz. to about 10 Hz. Also, the spring arrangement of an isolation system embodiment may include at least one pneumatic spring.

According to one aspect of the invention, the damping arrangement of a shock and vibration isolation system may include a power supply operatively connected to the at least one semi-active damper. The power supply may be included in the damper controller. In a particular aspect of the invention, the power supply may be rechargeable and the system may further comprise a recharging arrangement in electrical communication with the rechargeable power supply. The recharging arrangement may be attached to one of the base plate and the load plate and may have means for converting vibratory motion to electrical energy for storage in the rechargeable power supply. The means for converting may include an electrical coil, at least one spring and a magnet connected to the at least one spring. The magnet is disposed within the electrical coil so that oscillation of the magnet produces a current in the electrical coil.

Other objects and advantages of the invention will be apparent to one of ordinary skill in the art upon reviewing the detailed description of the invention.

DETAILED DESCRIPTION OF THE INVENTION

Shipboard systems are subject to multiple vibratory and shock inputs. In such environments, semi-active isolation systems may be more successful than a passive system. A semi-active isolation system can be designed to simultaneously isolate equipment from many combined and varying inputs. The present invention contemplates the combination of a semi-active damper with a passive spring element to provide an isolation system that performs well as both a vibration isolator and a shock isolator.

Combining shock and vibration isolation into a single package is highly beneficial in that the single combined isolation system replaces two separate systems. This can significantly reduce weight and increase available volume, which is particularly important in submarine applications where space is limited. Also, with varying and diverse inputs, a combined semi-active/passive isolation system can be designed to perform better than separate passive shock and vibration isolation systems operating in parallel.

Figure 1:
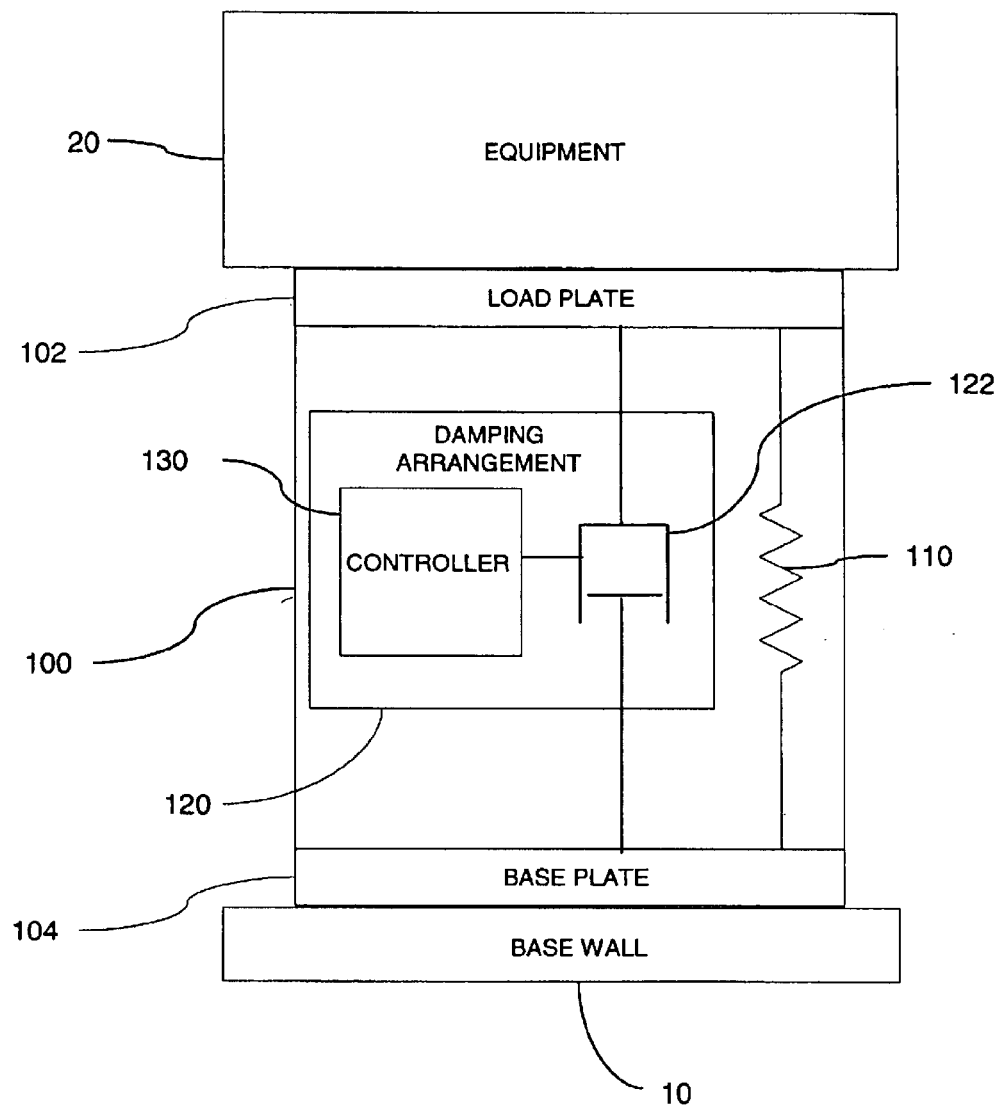
FIG. 1 is a schematic illustration of a shock and vibration isolation system according to an embodiment of the invention.

FIG. 1 is a schematic representation of a shock and vibration isolation system 100 according to an embodiment of the invention. The system 100 is disposed between and connected to a base wall 10 and equipment 20 requiring isolation. As used herein, the term "equipment" means any device, assembly or structure that may be supported by or mounted to the base wall 10. The base wall 10 is representative of a deck, bulkhead, wall or other structural portion of, for example, a ship, aircraft or building. The equipment 20 is representative of equipment that is to be mounted to the base wall 10 and is subject to damage from vibration or shock transmitted to the equipment 20 by the base wall 10 or, alternatively, has the potential for transmission of acoustic energy to the base wall 10.

The isolation system 100 includes a load plate 102 for attachment to the equipment 20 and a base plate 104 for attachment to the base wall 10. The system 100 also includes a passive spring element 110 and a semi-active damping arrangement 120 attached to and disposed between the load plate 102 and the base plate 104. The spring element 110 and the semi-active damping arrangement 120 are mounted in parallel so as to provide both shock and vibration isolation.

The spring element 110 may be designed specifically to protect the equipment from the effects of vibration and to minimize the amount of noise that may be transmitted from the equipment 20 to the base wall 10. For shipboard applications the spring element 110 should provide effective vibration isolation for inputs ranging from about 10 Hz. to about 200 Hz. This can be accomplished by using a "soft"

spring element with a natural frequency less than about 10 Hz. In general, the lower the natural frequency, the better the isolation system 100 will perform with regard to vibration isolation over the 10 to 200 Hz. range of interest.

The spring element 110 may comprise virtually any spring or combination of springs that provides an effective isolator to 10 to 200 Hz vibrations and can also survive varying shock inputs. This may include, for example, coil springs, leaf springs or pneumatic springs. Pneumatic or air springs typically have a low natural frequency and thus are well-suited for use in countering shipboard vibration and acoustic inputs. However, they ordinarily tend to behave poorly as shipboard shock isolators due to the fact that events such as underwater explosions tend to drive the spring into resonance following the initial transient.

Isolation against shock requires a mechanism for minimizing the effects of near instantaneous acceleration of the base wall 10. This can be provided by the damping arrangement 120, which is disposed between the base wall 10 and the equipment 20. The damping arrangement 120 provides a reactive force that can reduce the effects of the shock-magnitude base wall acceleration on the equipment 20. For a given set of equipment characteristics (e.g., the mass and center of gravity of the equipment 20) and shock inputs, the reaction force supplied by the damping arrangement 120 can be optimized to reduce specific output parameters such as the magnitude of displacement of the equipment 20 or the acceleration of the equipment 20.

The damping arrangement 120 can thus be designed so as to provide an optimum reaction to a particular scenario. A permanently fixed damping arrangement so designed, however, would virtually eliminate the effectiveness of the spring element 110. The ideal damping arrangement is one wherein the reaction force provided can be varied. This could be provided by an active control mechanism that provides counteracting forces to the equipment 20. Active control mechanisms, however, may be expensive, complex, and, under certain circumstances, can introduce instability to the system.

Accordingly, embodiments of the present invention use a semi-active damper 122 that provides a variable reaction force that can be controlled so as to nearly match the optimum reaction force as it varies with time. The semi-active damper 122 is mounted intermediate the base plate 104 and the load plate 102 in parallel with the spring element 110. The semi-active damper 122 should be capable of high-speed variation of the reaction force in response to detection of shock inputs at the base plate. Examples of semi-active dampers that may be used include but are not limited to magnetorheological (MR) fluid dampers, electrorheological (ER) fluid dampers, magnetorheological elastomer dampers and conventional hydraulic dampers configured to allow control of the reaction force of the damper. MR fluid dampers are particularly suited for use in the damping arrangement 120 because they are capable of producing high, variable damping forces with very low power requirements, particularly as compared to ER dampers.

The semi-active damper 122 is driven by a controller 130 that determines the optimum reaction force based on measurements of the relative displacement between the base wall 10 and the equipment 20 and/or accelerations of the base wall 10 and the equipment 20. As will be discussed in more detail, hereafter, the optimum reaction force calculation can be formulated so as to optimize a cost function with selected weighting of output parameters of interest to the designer.

The controller 130, which may include an internal power supply or may be externally powered, uses a control algorithm to selectively command the semi-active damper 122 to provide the desired reactive force. This reactive force can be constantly updated to maximize (or minimize) the damping effect on the motion of the equipment 20. The relative displacement between the load plate 102 and the base plate 104 and acceleration data for the load plate 102 and the base plate 104 may be provided by conventional accelerometers and linear measurement devices.

The semi-active damper 122 is attached to both the load plate 102 and base plate 104. It is therefore desirable to minimize the baseline, unpowered damping effect of the semi-active damper 122. The degree of damping when the damping arrangement 120 is unpowered is preferably low enough to allow the passive spring element 110 to achieve full effectiveness with respect to vibration isolation. Maintaining a low baseline damping level also provides a failsafe mechanism that can provide a degree of damping even under a failure of the system's power supply.

As an alternative to maintaining a low baseline damping level, the damping arrangement 120 may be configured so that the semi-active damper is not attached to the load plate 102, the base plate 104 or both until the system 100 detects a shock input. For example, the damping arrangement 120 could be configured to include one or more clamping or latching mechanisms that engage the end or ends of the semi-active damper 122 for attachment to the base plate 104 or load plate 102 upon detection of a shock input. In this embodiment, the damper 122 would have no effect on vibration-only performance because there would be no reaction force applied.

Figure 2:
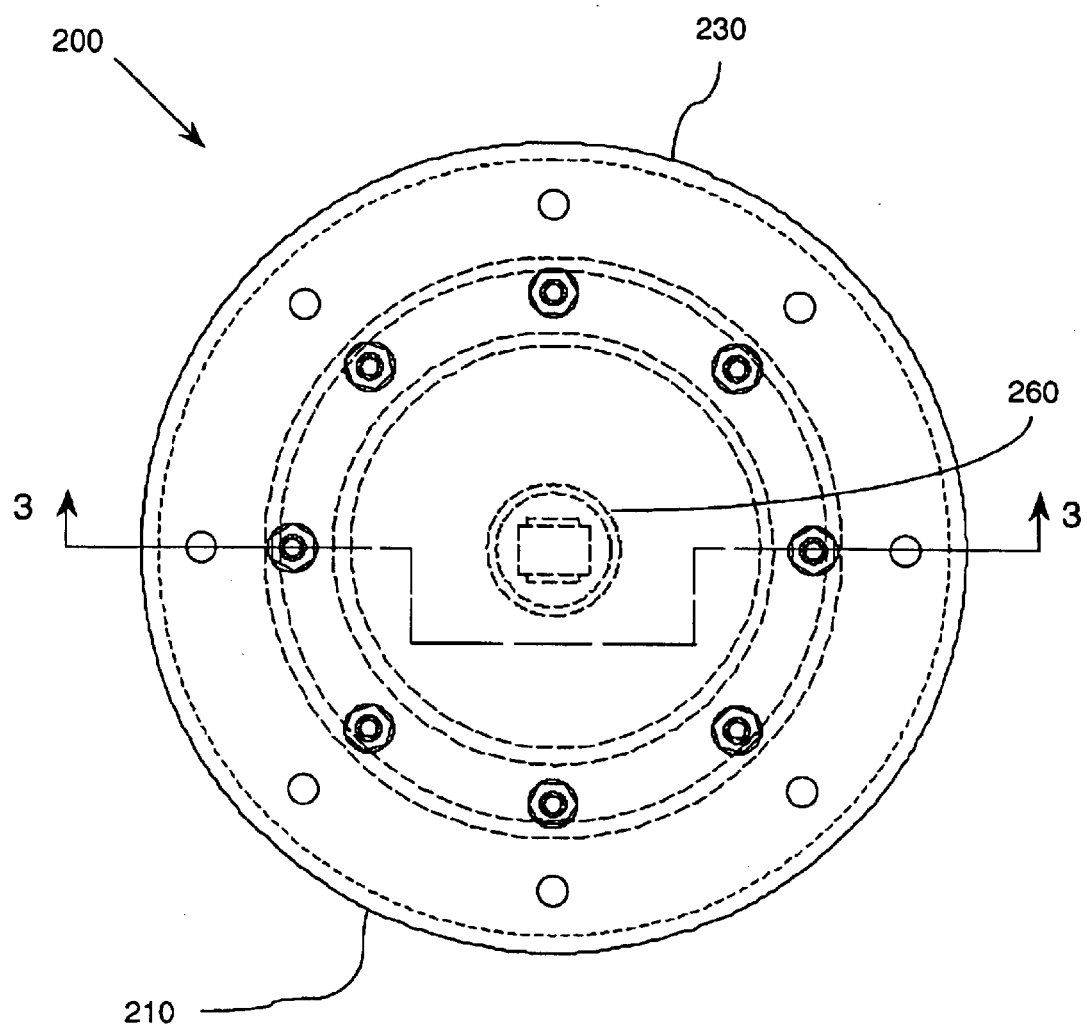
FIG. 2 is a top view of a shock and vibration isolation system according to an embodiment of the invention.
Figure 3:
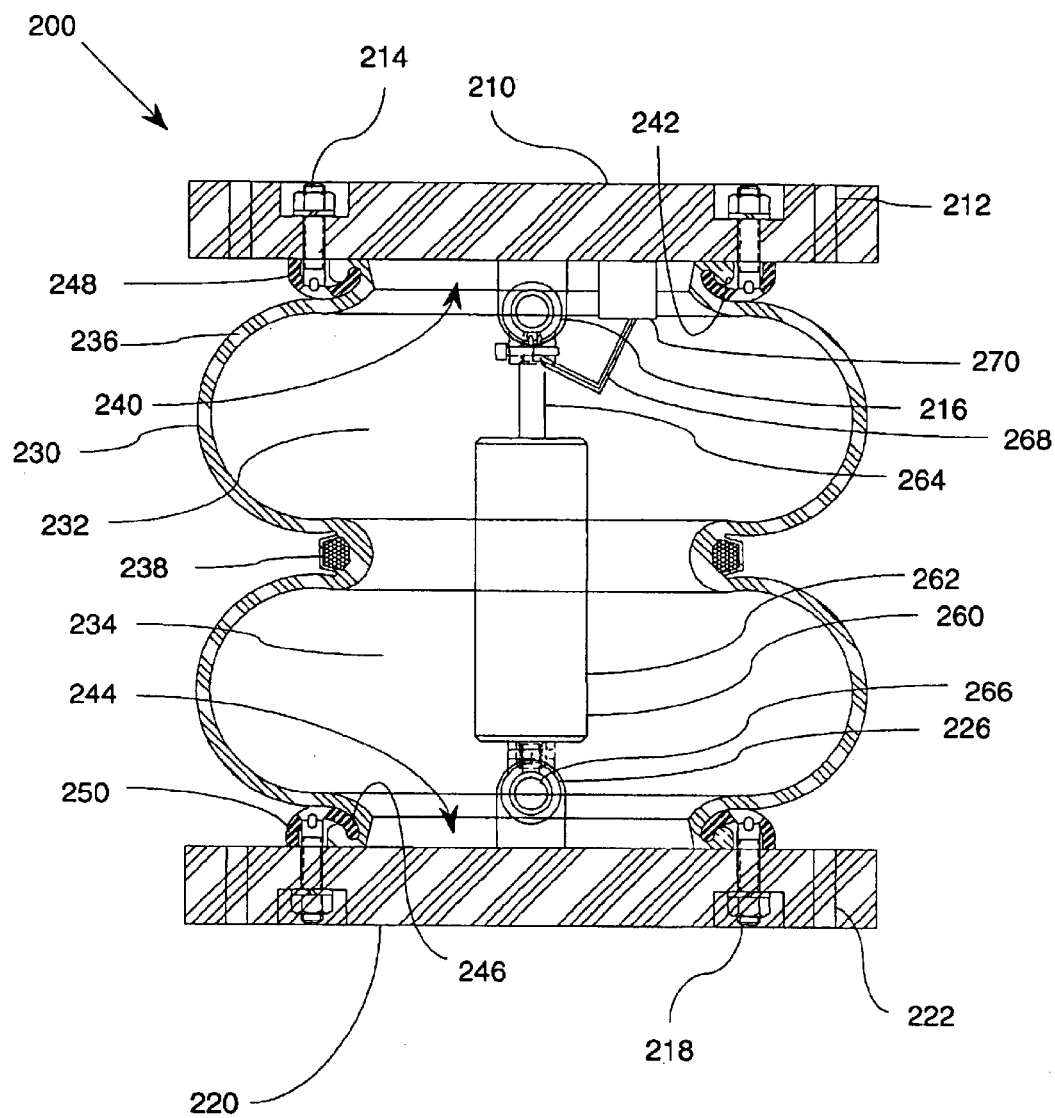
FIG. 3 is section view of the shock and vibration isolation system of FIG. 2.

Turning now to FIGS. 2 and 3, an exemplary shock and vibration isolation system 200 combines an air spring 230 with an MR fluid damper 260 mounted in parallel through the center of the air spring 230. The air spring 230 and the MR fluid damper 260 are mounted in parallel between a load plate 210 and a base plate 220. The shock and vibration isolation system 200 also includes a controller 270 in electrical communication with the MR fluid damper 260.

As shown in FIG. 2, the air spring 230 is generally circular. The air spring 230 includes a pair of chambers 232, 234 formed by an elastomeric bladder 236 cinched by a centrally located belt 238. The bladder 236 has an upper opening 240 surrounded by an upper bead 242 and a lower opening 244 surrounded by a lower bead 246. The upper opening 240 is sealed by a clamp 248 to the load plate 210, which can be attached to the equipment or structure to be isolated. The clamp 248 is secured to the load plate 210 by a series of bolts 214. The lower opening 244 is sealed by a clamp 250 to the base plate 220. The clamp 250 is secured to the base plate 220 by a series of bolts 218.

The base plate 220 is generally parallel to the load plate 210 and is configured for attachment to a base wall. The load plate 210 and the base plate 220 are illustrated with mounting holes 212 and 222 through which bolts or other fasteners can be used to attach the load and base plates 210, 220 to the structures of interest. It will be understood by those of ordinary skill in the art that any fastener may be used that rigidly fixes the load and base plates 210, 220 to their respective structures. The load and base plates 210, 220 may also be permanently attached such as by welding, for example.

It will be understood that the air spring 230 may be any gas or air pressure-based spring having suitable vibration isolation performance. An exemplary two chamber convoluted pneumatic spring that may be used in the present invention is the Model 20 Airmount® isolator produced by the Firestone Industrial Products Co. This spring has a natural frequency of about 2.0 Hz. at a pressure of 40 psig.

The MR fluid damper 260 has a cylindrical housing 262 that houses a fluid chamber with magnetorheological fluid contained therein. An attachment eye 266 extends downward from one end of the housing 262. The attachment eye 266 is pivotally attached to a bracket 226 attached to the base plate 220. The MR fluid damper 260 has a shaft 264 that is attached to a piston disposed within the fluid chamber. The opposite end of the shaft 264 is pivotally attached to a bracket 216 attached to the load plate 210.

Mounting the MR fluid damper 260 in the interior of the air spring 230 provides a simple, relatively compact shock isolation system. It will be understood by those of ordinary skill in the art, however, that any configuration may be used in which the MR fluid damper 260 and the air spring 230 are mounted in parallel between the base plate 220 and the load plate 210. For example, it may be possible to configure an air spring (or other spring) that could be disposed internal to the MR fluid damper.

The operative characteristics of MR fluid dampers such as the MR damper 260 are known in the art. MR fluid dampers typically use an electromagnetic coil wrapped around the piston to effect viscosity changes in a magnetorheological fluid inside the chamber of the damper. This changes the reactive force transmitted through the piston to the shaft. In the MR fluid damper 260, the electromagnetic coil is energized through lead lines 268 that are electrically connected to a damper controller 270 mounted to the load plate 210. The damper controller 270 may alternatively be mounted to the base plate 220. The damper controller 270 may also be mounted external to the isolation system 200.

The present invention can utilize any semi-active damper that can provide the required reactive force within a time interval sufficient to reduce the reaction of the load plate 210 to a shock-induced movement of the base plate 220. A suitable MR damper for at least some applications of the invention is the Rheonetic™ Model RD-1003, produced by Lord Corporation. This damper provides a maximum reactive force of at least 650 pounds when fully energized and less than 150 pounds of reactive force when not energized. It uses an input current of about 1.0 amp from a 12 V DC power source. It will be understood that multiple MR dampers 260 may be used in conjunction with a single spring element in order to provide a sufficient reaction force.

Figure 4:
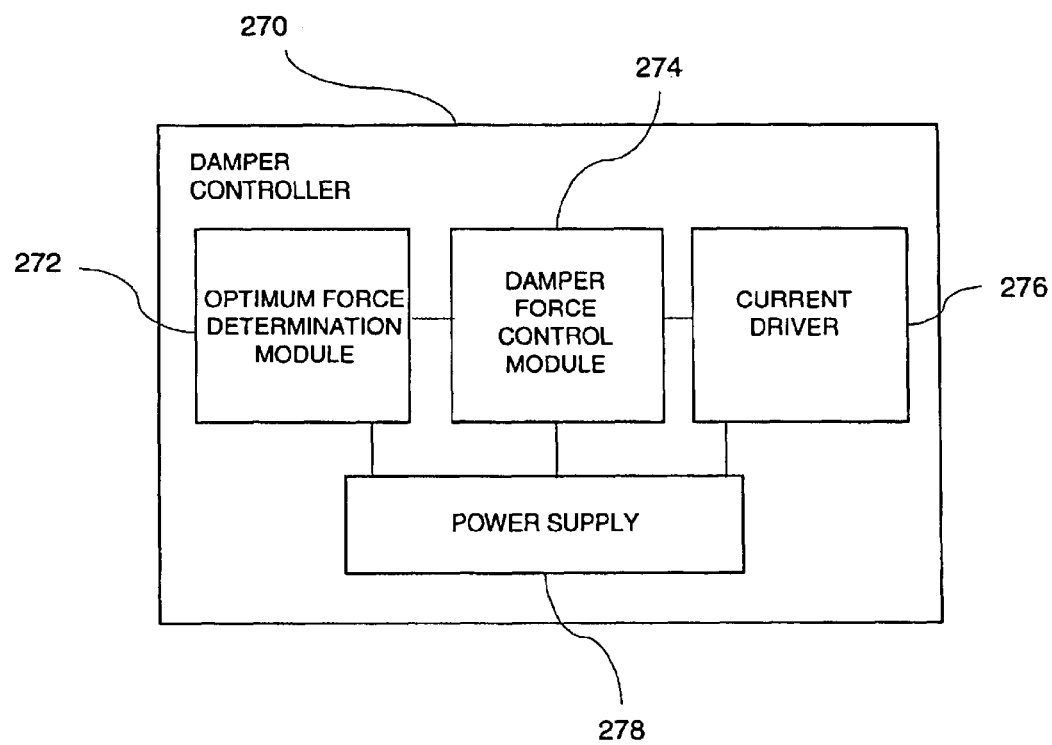
FIG. 4 is a block diagram of a damper controller of a shock and vibration isolation system according to an embodiment of the invention.

A block diagram of a damper controller 270 is shown in FIG. 4. The damper controller 270 includes an optimum force determination module 272, a damper force control module 274 and a current driver 276. The damper controller 270 may also include a power supply 278. Alternatively or in addition, the damper controller 270 may be electrically connected to an external power supply.

The optimum force determination module 272 is programmed to determine an optimum reactive force based on changes in the displacement of the load plate 210 relative to the base plate 220. Specifically, the optimum force can be computed by the optimum force determination module 272 from the equation:

$$F_{Opt} = G_1 X_{Rel} + G_2 V_{Rel} \qquad \text{(Eq. 1)}$$

Where:

$X_{Rel}$ is the relative displacement between load plate 210 and base plate 220

$V_{Rel}$ is the velocity of load plate 210 relative to base plate 220

$G_1$ and $G_2$ are predetermined gain values

The predetermined gains $G_1$ and $G_2$ are determined so as to provide a desired balance between the maximum relative displacement between the load and the base wall, the maximum absolute acceleration of the load and the maximum damper force.

The optimum force determination module 272 can use either displacement data or acceleration data versus time to determine the instantaneous relative displacement and relative velocity for the shock and vibration isolation system 200. Displacement data may be provided by, for example Linear Variable Differential Transformers (LVDTs) mounted between the load plate 210 and the base plate 220. Acceleration data may be provided by accelerometers mounted to the load plate 210 and the base plate 220.

The optimum force determination module 272 may include a programmable digital processor that can be reprogrammed in the field. Alternatively or in addition, the optimum force determination module 272 may include modular analog circuitry that is easily replaceable in the field.

The optimum force value is provided by the optimum force determination module 272 to the damper force control module 274 which uses a clipped optimal control algorithm to control the MR damper 260. It will be understood that other control algorithms known in the art may also be are used in the damper force control module 274. These include but are not limited to algorithms based on Lyapunov stability theory, decentralized bang-bang control, and modulated homogeneous friction control.

The current driver 276 is used to energize the MR damper using predetermined current levels. In the clipped optimal control methodology, the current driver 276 is configured to provide either zero current or full-scale current only depending on commands from the damper force control module 274. The command from the damper force control module 274 depends on a comparison of the actual damper reaction force to the optimum force, which may be measured or derived from acceleration and displacement data. If the optimum force and the actual force have the same sign and the actual damper force is less than the optimal damper force, the force control module 274 signals the current driver 276 to transmit full-scale current to the MR damper. If the two forces are substantially equal, the control module 274 maintains the previous current level (either zero or full-scale). Under all other conditions, the current level is commanded to zero. The time required to execute the algorithm and cycle the damper force control module 274 must be significantly less than the duration of the shock event, which is typically on the order of a millisecond or less. It will be understood by those having ordinary skill in the art that the clipped optimal algorithm avoids the necessity of computing an intermediate current level intended to provide the optimum force directly.

The optimum damper force is dependent on the mass and center of gravity of the equipment being protected by the shock and vibration isolation system 200. If the equipment is modified or replaced, the optimum damping force is changed. This would ordinarily require replacement of the isolation system or at least a change to the damping mechanism. A significant advantage of the isolation systems of the present invention is that changes to the equipment can be accounted for without replacing the shock and vibration isolation system 200 and without changes to the MR damper 260 or the spring element. Instead, such changes may be accounted for by changing the gains used in the calculations of the optimum force determination module 272. If a digital processor is used to make the optimum force calculations, the change can be accomplished through a simple programming change. If analog circuitry is used, the circuitry can be configured as a compact module that is easily replaceable with another module configured for calculations using updated gains.

The shock and vibration isolation system 200 may also be made self-adapting by programming the optimum force determination module 272 to perform its own calculation of the gains based on a predetermined optimizable cost function. The optimum force determination module 272 may be further programmed to identify changes in the mass of the equipment based on relative positions of the load plate 210 and the base plate 220 in the steady state condition. A change in the steady state distance between the plates 210, 220 would indicate a change in the mass supported by the isolation system. It should be noted that the self-adapting feature can be used whenever the isolation system 200 is oriented so as to provide vertical support. If the isolation system 200 is angled, for example, the optimum force determination module 272 may be programmed to account for the effect of multiple degrees of freedom.

The power requirements for a semi-active device such as the MR damper 260 are relatively small compared to the requirements of an active isolation system. Under normal circumstances, the MR damper 260 is not energized. Only upon receiving a shock input through the base wall will the damper force control module 274 command the MR damper 260 to be energized. When full-scale reaction force is commanded, the RD-1003 draws only 2 amps from a 12 V DC source. Further, the duration of a shock event and thus the maximum duration of damper energization is generally on the order of only 1.5 seconds.

The power supply 278 itself may be any electrical storage device such as a battery that is capable of supplying a 2 amp current for approximately 1.5 seconds. In order to provide for multiple events, however, the battery should have additional storage capacity or be rechargeable. Alternatively, a capacitor may be used.

Figure 5:
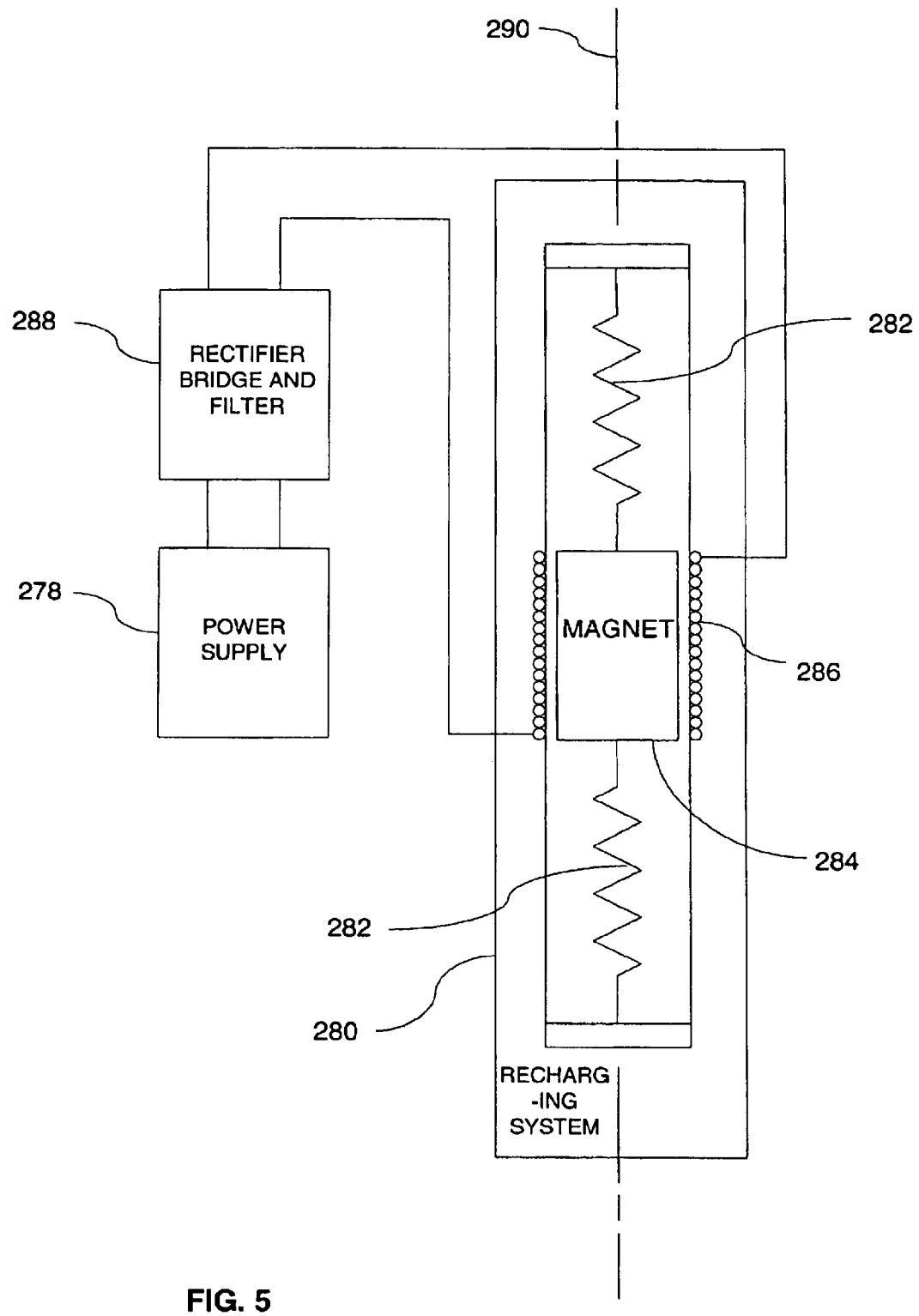
FIG. 5 is a schematic illustration of a recharging system of a shock and vibration isolation system according to an embodiment of the invention.

The power supply 278 may be configured to be rechargeable from an external source in any conventional manner. The present invention, however, provides a unique self-charging feature that can be used with small rechargeable batteries or capacitors. FIG. 5 is a schematic illustration of a recharging arrangement 280 that converts the vibratory motion of the load plate 210 or the isolated equipment to electrical energy that can be stored in the power supply 278. The recharging arrangement 280 is a spring/mass system that can be attached to the load plate 210 or to the equipment or structure mounted to the load plate 210.

The mass 284 of the spring/mass recharging arrangement 280 is or includes a magnet and is attached to one or more springs 282. The springs 282 are configured so that vibration of the recharging arrangement 280 causes the magnet to oscillate along the axis 290 of the system. One or more electrical coils 286 are disposed along the axis 290 around the magnet/mass 284. The oscillatory motion of the magnet/mass 284 induces a current in the electrical coils 286 which is passed through a rectifier bridge/filter 288 to the power supply 278.

The spring/mass-based recharging arrangement may be tuned to the resonance frequency of the overall shock and vibration isolation system 200 in order to maximize the amplitude of the oscillations and enhance the current generation of the arrangement.

It will be understood that the system 280 may be mounted to the base plate 220 instead of the load plate 210. However, the vibratory motion of the base plate 220 is likely to be relatively small compared to the motion of the load plate 210 and may be too small to recharge the power supply 278. A DC—DC converter could be used step up the voltage to an acceptable level.

The shock and vibration isolation system 200 was mathematically modeled to demonstrate the performance of the system in isolating a load mass from both shock and vibration. The model used simulates an electronic equipment cabinet consisting of an external shell hard-mounted to a ship deck and an internal isolated equipment rack. This is a typical arrangement for shipboard electronic equipment. The isolation system was modeled as four MR dampers and a single air spring with a single degree of freedom (SDOF).

Figure 6:
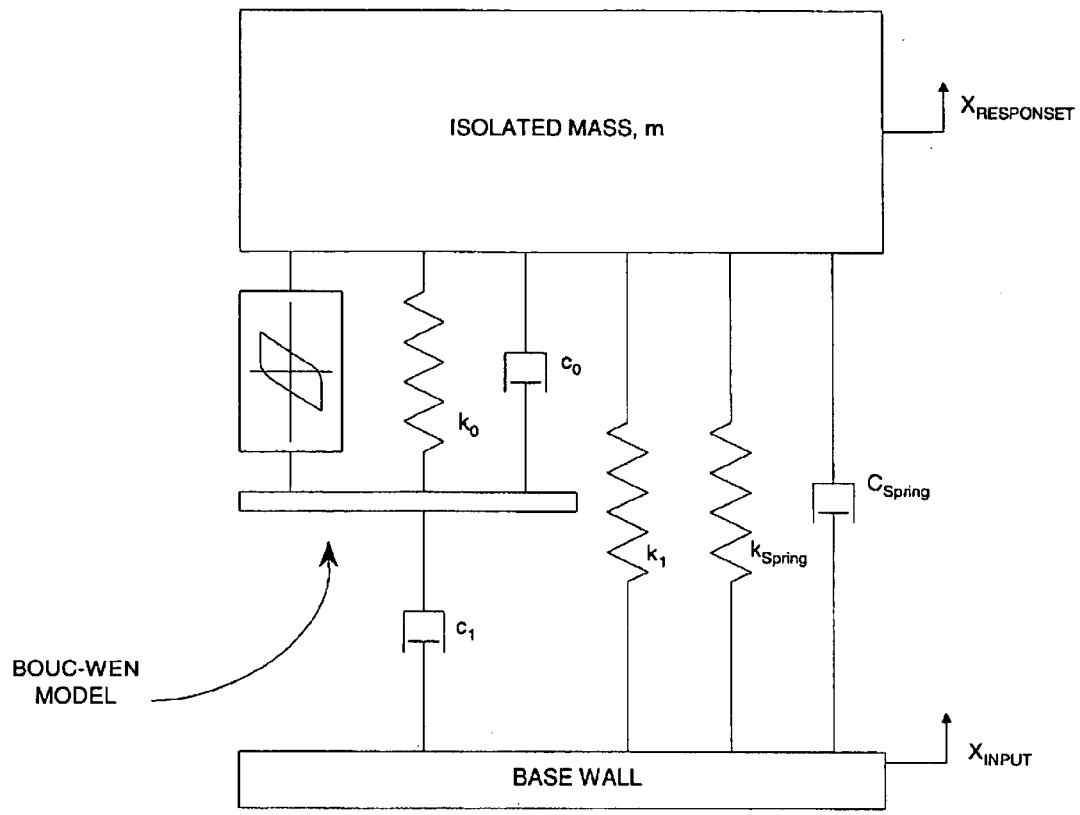
FIG. 6 is a schematic representation of a mathematical model of a shock and vibration isolation system according to an embodiment of the invention.

To investigate the effectiveness of the air spring/MR damper combination as a combined isolation system requires an accurate model of the highly nonlinear MR damper. One such model that very accurately predicts the response of the MR damper is the so-called Bouc-Wen model. The Bouc-Wen methodology was used to model the Lord RD-1003 MR dampers. The characteristics of the Firestone Model 20 air spring were used. The force-deflection behavior of the air spring was provided by Firestone and incorporated into the model. It should be noted that over the deflection range of interest the air spring is very nearly linear and therefore could be modeled as a linear spring. The weight of the isolated equipment was 990 lbs. and the natural frequency of the air spring was 2.02 Hz. These are catalog values for the Firestone air spring with an internal pressure of 40 psig. The complete SDOF model is shown schematically in FIG. 6.

The system was modeled with a clipped optimal control algorithm. Data sample/controller cycling frequency was fixed at 10,000 Hz. All numerical simulations were performed using MATLAB® and Simulink®.

Figure 7:
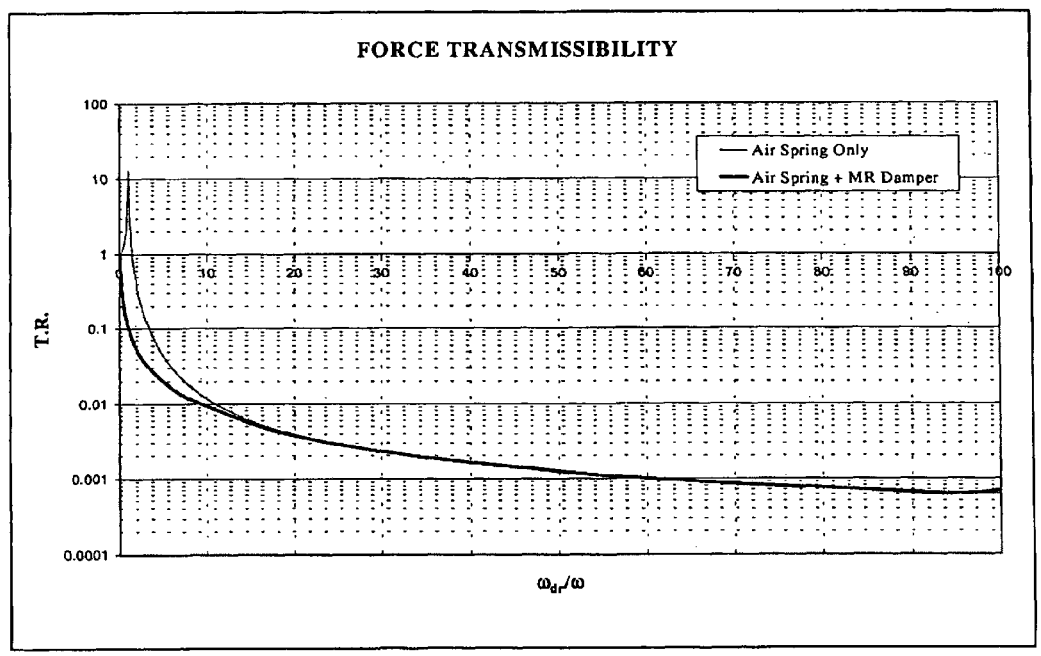
FIG. 7 is a graph of isolation system transmissibility results obtained using a mathematical model of a shock and vibration isolation system according to an embodiment of the invention.

In order to examine the effect of the MR dampers 260 on the vibration isolation performance of the air spring 230, the force transmissibility was plotted for the air spring 230 only and for the air spring 230 with the addition of the MR dampers 260 in passive off (i.e., zero volts applied to the current driver 276) mode. No voltage was applied to the damper 260 since the most effective vibration isolation performance will be achieved with minimum damping. The input to the model was a sinusoidal force of varying driving frequencies applied above-mount (i.e., applied to the load plate 210). The transmissibility ratio was then plotted versus the frequency ratio as shown in FIG. 7. FIG. 7 illustrates that the addition of the MR damper 260 actually improves vibration isolation performance when compared to the air spring 230 without the damper 260. This result is surprising as the commercial MR damper used is fairly stiff and uses high friction seals. It should be noted that with the MR damper, the shock and vibration isolation system 200 is very effective over the 10–200 Hz vibration/acoustic isolation range of interest which corresponds to an approximate frequency ratio range of 5 to 99 based on the 2.02 Hz natural frequency of the shock and vibration isolation system 200.

Figure 8:
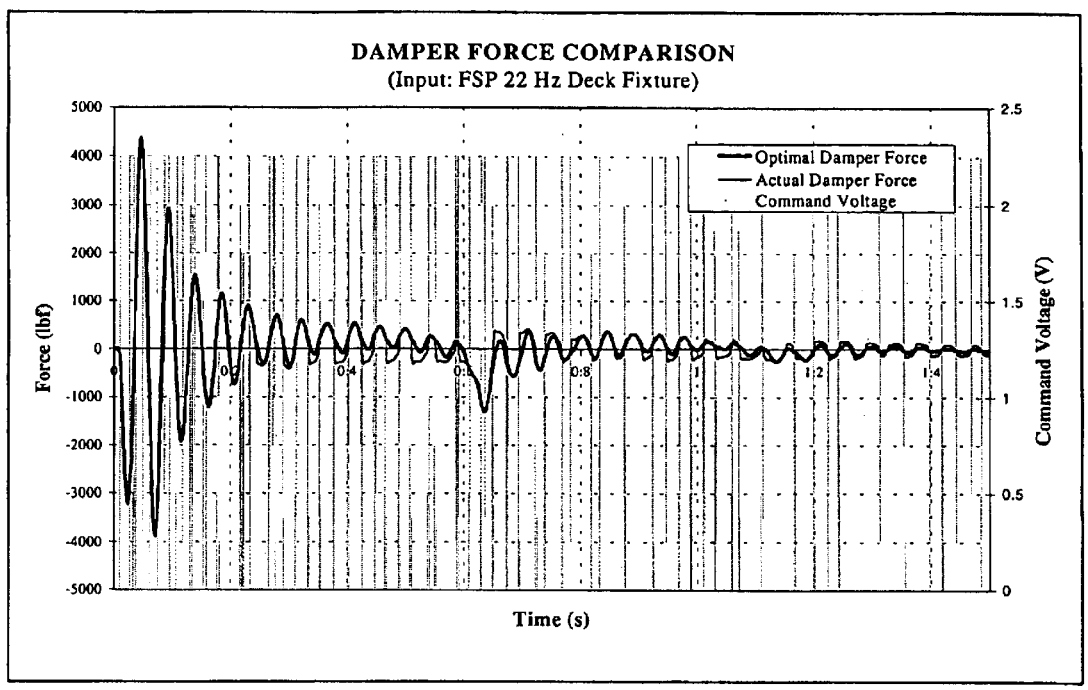
FIG. 8 is a graph of damper force results obtained for a deck fixture shock scenario using a mathematical model of a shock and vibration isolation system according to an embodiment of the invention.

To determine the effectiveness of the shock and vibration isolation system 200 as a shock isolator, the model was subjected to a base excitation which was derived from a known deck response (Floating Shock Platform (FSP) with 22 Hz Deck Fixture) due to an underwater explosion. The response displacement and acceleration were recorded for the air spring 230 with the MR dampers 260. FIG. 8 compares the actual damper force to the optimal damper force. Also shown is the command voltage to the current driver that is the output from the control algorithm. It can be seen that the actual damper force nearly matches the optimal damper force which indicates that the isolation system is successfully providing the optimized damping force derived from the relative displacement and relative velocity across the isolation system 200.

Figure 9:
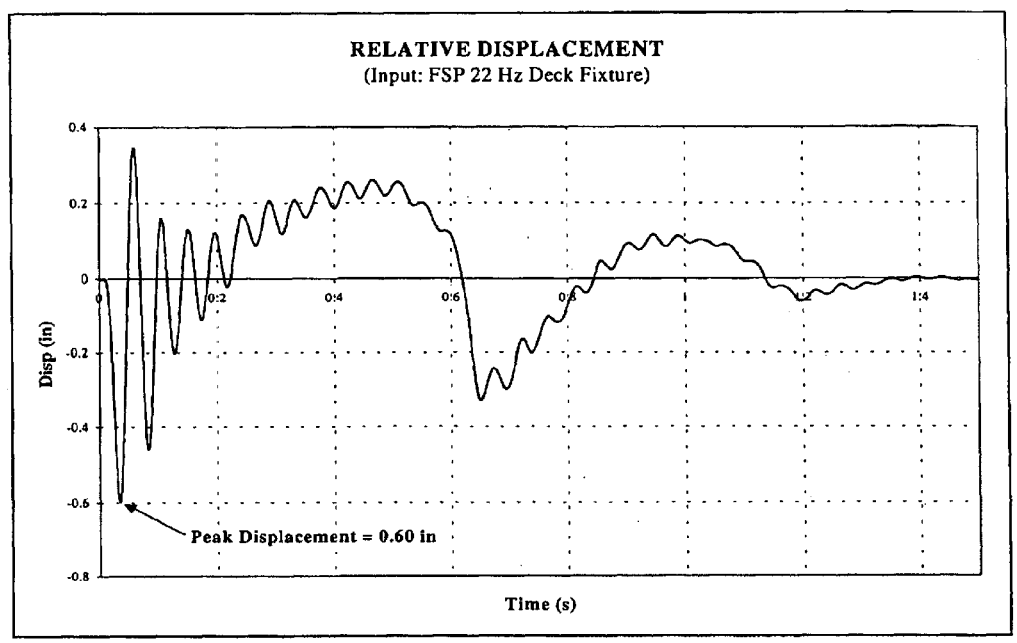
FIG. 9 is a graph of relative displacement results obtained for a deck fixture shock scenario using a mathematical model of a shock and vibration isolation system according to an embodiment of the invention.
Figure 10:
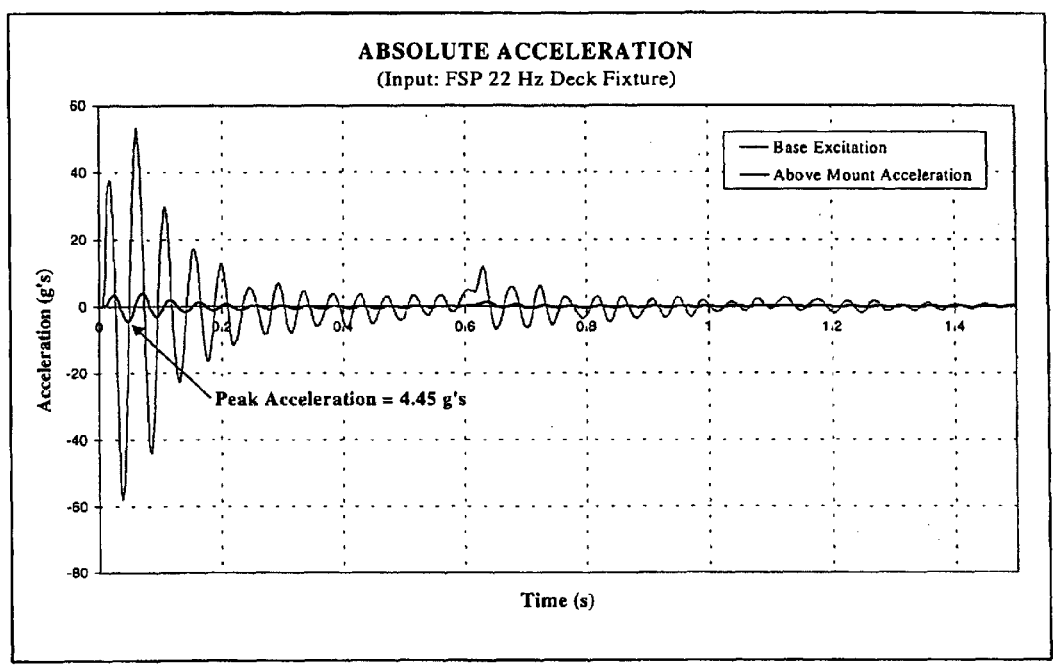
FIG. 10 is a graph of absolute acceleration results obtained for a deck fixture shock scenario using a mathematical model of a shock and vibration isolation system according to an embodiment of the invention.

The relative displacement and absolute acceleration transients are illustrated in FIGS. 9 and 10, respectively. Under the modeled shock scenario, a typical commercial passive isolation device would experience deflections of two to three inches. FIG. 9 shows that the shock and vibration isolation system 200 can reduce the maximum deflection to 0.6 in. This demonstrates that the present invention offers a significant improvement over passive devices in terms of reducing relative displacement across the mount. Reducing relative displacements can be critical if a particular application has a tight rattle space requirement. This is often the case in shipboard applications, and particularly in submarine applications, where space is at a premium. FIG. 10 shows that the shock and vibration isolation system 200 offers significant isolation of "real" shock inputs. The peak equipment acceleration of 4.45 g's is well below the threshold of 7 to 8 g's that is a target for inclusion of commercial-grade COTS equipment on ships.

The present invention provides significant advantages in performance and in flexibility over prior art isolation devices. The isolation system of the present invention offers an ideal combination of acoustic/vibration isolation and shock isolation. The system is adaptable to varying equipment mass and mass distribution and may be entirely self-contained. It will be understood that the isolation system of the present invention may be used in any orientation and is not limited to isolation in a single degree of freedom. Also, the isolation system of the invention is not limited as to size or mass that can be isolated. Further, it will be understood that multiple isolation systems according to the invention may be used in combination. Other embodiments and uses of the invention will be apparent to those skilled in the art from consideration of the specification and practice of the invention disclosed herein. The specification and examples should be considered exemplary only. The scope of the invention is limited only by the claims appended hereto.

What is claimed is:

1. A shock and vibration isolation system for mounting equipment to a base wall, the system comprising:
    a load plate configured for attachment of the equipment thereto;
    a base plate configured for attachment to the base wall; the base plate being substantially parallel to the load plate;
    a spring arrangement disposed intermediate the load plate and the base plate, the spring arrangement engaging the load plate and the base plate to bias the load plate and the base plate in a separated relationship;
    at least one semi-active damper operatively connected to the load plate and the base plate for providing a selectively variable reaction force to the load plate and the base plate responsive to a relative displacement of the load plate with respect to the base plate; and
    an adaptive damper controller operatively connected to the at least one semi-active damper for controlling the reaction force applied to the load plate and the base plate, the damper controller including an optimum damper force determination module programmed for calculating an optimum reaction force $F_{Opt}$ using the equation $$F_{Opt} = G_1 X_{Rel} + G_2 V_{Rel}$$

where $X_{Rel}$ is the relative displacement between the load plate and the base plate, $V_{Rel}$ is the velocity of the load plate relative to base plate, $G_1$ is a first gain value and $G_2$ is a second gain value, the optimum damper force determining module being further programmed for calculating the first and second gain values based on an optimizable cost function.

2. An isolation system according to claim 1 wherein the at least one semi-active damper is a magnetorheological fluid damper.

3. An isolation system according to claim 1 wherein the at least one semi-active damper is an electrorheological fluid damper.

4. An isolation system according to claim 1 wherein the controller further includes
    a current driver operatively connected to the at least one semi-active damper for selectively supplying current to energize the at least one semi-active damper;
    a damper force control module in communication with the optimum force determination module and the current driver, the damper force control module being adapted for controlling the supply of current to the at least one semi-active damper according to a predetermined control algorithm.

5. An isolation system according to claim 4 wherein the control algorithm is selected from the group consisting of clipped optimal control, Lyapunov stability theory, decentralized bang-bang control, and modulated homogeneous friction control.

6. An isolation system according to claim 1 wherein the optimum reaction force determination module comprises a programmable digital processor having optimum force determination software configured for calculating the first and second gains and the optimum reaction force.

7. An isolation system according to claim 6 wherein the programmable digital processor has gain adjustment software configured for determining a change in mass of the equipment based on a change in steady state spacing between the load plate and the base plate and for adjusting at least one of the first and second gains based on the determined change in mass.

8. An isolation system according to claim 1 wherein the optimum force determination module comprises field replaceable analog circuitry adapted for providing the optimum reaction force using the first and second gains.

9. An isolation system according to claim 1 wherein the damping arrangement includes a power supply operatively connected to the at least one semi-active damper.

10. An isolation system according to claim 9 wherein the power supply is included in the damper controller.

11. An isolation system according to claim 9 wherein the power supply is rechargeable, the system further comprising a recharging arrangement in electrical communication with the rechargeable power supply, the recharging arrangement being attached to one of the base plate and the load plate and having means for converting vibratory motion to electrical energy for storage in the rechargeable power supply.

12. An isolation system according to claim 11 wherein the means for converting includes an electrical coil, at least one spring and a magnet connected to the at least one spring, the magnet being disposed within the electrical coil so that oscillation of the magnet produces a current in the electrical coil.

13. An isolation system according to claim 1 wherein the spring arrangement has a natural frequency in a range from about 1.0 Hz. to about 10.0 Hz.

14. An isolation system according to claim 1 wherein the spring arrangement includes at least one pneumatic spring.

15. A shock and vibration isolation system for mounting equipment to a base wall, the system comprising:
  a load plate configured for attachment of the equipment thereto;
  a base plate configured for attachment to the base wall; the base plate being substantially parallel to the load plate;
  a spring arrangement disposed intermediate the load plate and the base plate, the spring arrangement engaging the load plate and the base plate to bias the load plate and the base plate in a separated relationship;
  damping means for providing a selectively variable reaction force to the load plate and the base plate responsive to a relative displacement of the load plate with respect to the base plate, the damping means being disposed intermediate the load plate and the base plate; and
  adaptive controller means for controlling the reaction force applied to the load plate and the base plate, the controller means being operatively connected to the damping means and including means for calculating an optimum reaction force $F_{Opt}$ using the equation $$F_{Opt} = G_1 X_{Rel} + G_2 V_{Rel}$$

where $X_{Rel}$ is the relative displacement between the load plate and the base plate, $V_{Rel}$ is the velocity of the load plate relative to base plate, $G_1$ is a first gain value and $G_2$ is a second gain value, the means for calculating an optimum reaction force being adapted for calculating the first and second gain values based on an optimizable cost function.

16. An isolation system according to claim 15 wherein the damping means includes at least one semi-active damper operatively connected to the base plate and the load plate.

17. An isolation system according to claim 16 wherein the at least one semi-active damper is a magnetorheological fluid damper.

18. An isolation system according to claim 16 wherein the at least one semi-active damper is an electrorheological fluid damper.

19. An isolation system according to claim 16 wherein the controller means further includes
  means for selectively supplying current to energize the semi-active damper; and
  means for controlling the supply of current to the semi-active damper according to a predetermined control algorithm, the means for controlling the supply of current being in communication with the means for selectively supplying current and the means for calculating an optimum reaction force.

20. An isolation system according to claim 19 wherein the control algorithm is selected from the group consisting of clipped optimal control, Lyapunov stability theory, decentralized bang-bang control, and modulated homogeneous friction control.

21. An isolation system according to claim 15 wherein the means for calculating an optimum reaction force comprises a programmable digital processor having optimum force determination software configured for calculating the first and second gains and the optimum reaction force.

22. An isolation system according to claim 21 wherein the programmable digital processor has gain adjustment software configured for determining a change in mass of the equipment based on a change in steady state spacing between the load plate and the base plate and for adjusting at least one of the first and second gains based on the determined change in mass.

23. An isolation system according to claim 15 wherein the means for calculating an optimum reaction force comprises field replaceable analog circuitry adapted for providing the optimum reaction force using the first and second gains.

24. An isolation system according to claim 16 wherein the damping means includes a power supply operatively connected to the at least one semi-active damper.

25. An isolation system according to claim 24 wherein the power supply is rechargeable, the system further comprising means for recharging the rechargeable power supply, the means for recharging being attached to one of the base plate and the load plate and having means for converting vibratory motion to electrical energy for storage in the rechargeable power supply.

26. An isolation system according to claim 25 wherein the means for converting includes an electrical coil, at least one spring and a magnet connected to the at least one spring, the magnet being disposed within the electrical coil so that oscillation of the magnet produces a current in the electrical coil.

27. An isolation system according to claim 15 wherein the spring arrangement has a natural frequency in a range from about 1.0 Hz. to about 10.0 Hz.

28. An isolation system according to claim 15 wherein the spring arrangement includes at least one pneumatic spring.

29. A shock and vibration isolation system for mounting equipment to a base wall, the system comprising:
  a load plate configured for attachment of the equipment thereto;
  a base plate configured for attachment to the base wall; the base plate being substantially parallel to the load plate;
  a spring arrangement disposed intermediate the load plate and the base plate, the spring arrangement engaging the load plate and the base plate to bias the load plate and the base plate in a separated relationship;
  at least one magnetorheological fluid damper disposed intermediate the load plate and the base plate, the a magnetorheological fluid damper being adapted for providing a selectively variable reaction force to the load plate and the base plate responsive to a relative displacement of the load plate with respect to the base plate; and
  an adaptive damper controller operatively connected to the at least one magnetorheological fluid damper for controlling the reaction force applied to the load plate and the base plate, the damper controller including an optimum damper force determination module programmed for calculating an optimum reaction force $F_{Opt}$ using the equation $$F_{Opt} = G_1 X_{Rel} + G_2 V_{Rel}$$

where $X_{Rel}$ is the relative displacement between the load plate and the base plate, $V_{Rel}$ is the velocity of the load plate relative to base plate, $G_1$ is a first gain value and $G_2$ is a second gain value, the optimum damper force determination module being further programmed for calculating the first and second values based on an optimizable cost function.

30. An isolation system according to claim 29 wherein the controller further includes
  a current driver operatively connected to the at least one magnetorheological fluid damper for selectively supplying current to energize the at least one magnetorheological fluid damper;
  a damper force control module in communication with the optimum force determination module and the current driver, the damper force control module being adapted for controlling the supply of current to the at least one magnetorheological fluid damper according to a predetermined control algorithm.

31. An isolation system according to claim 30 wherein the control algorithm is selected from the group consisting of clipped optimal control, Lyapunov stability theory, decentralized bang-bang control, and modulated homogeneous friction control.

32. An isolation system according to claim 29 wherein the optimum reaction force determination module comprises a programmable digital processor having optimum force determination software configured for calculating the first and second gains and the optimum reaction force.

33. An isolation system according to claim 32 wherein the programmable digital processor has gain adjustment software configured for determining a change in mass of the equipment based on a change in steady state spacing between the load plate and the base plate and for adjusting at least one of the first and second gains based on the determined change in mass.

34. An isolation system according to claim 29 wherein the optimum force determination module comprises field replaceable analog circuitry adapted for providing the optimum reaction force using the first and second gains.

35. An isolation system according to claim 29 further comprising a power supply operatively connected to the at least one magnetorheological fluid damper.

36. An isolation system according to claim 35 wherein the power supply is included in the damper controller.

37. An isolation system according to claim 35 wherein the power supply is rechargeable, the system further comprising a recharging arrangement in electrical communication with the rechargeable power supply, the recharging arrangement being attached to one of the base plate and the load plate and having means for converting vibratory motion to electrical energy for storage in the rechargeable power supply.

38. An isolation system according to claim 37 wherein the means for converting includes an electrical coil, at least one spring and a magnet connected to the at least one spring, the magnet being disposed within the electrical coil so that oscillation of the magnet produces a current in the electrical coil.

39. An isolation system according to claim 29 wherein the spring arrangement has a natural frequency in a range from about 1.0 Hz. to about 10.0 Hz.

40. An isolation system according to claim 29 wherein the spring arrangement includes at least one pneumatic spring.

41. A shock and vibration isolation system for mounting equipment to a base wall, the system comprising:

a load plate configured for attachment of the equipment thereto;

a base plate configured for attachment to the base wall; the base plate being substantially parallel to the load plate;

a spring arrangement disposed intermediate the load plate and the base plate, the spring arrangement engaging the load plate and the base plate to bias the load plate and the base plate in a separated relationship;

at least one semi-active damper operatively connected to the base plate and the load plate for providing a selectively variable reaction force to the load plate and the base plate responsive to a relative displacement of the load plate with respect to the base plate;

a rechargeable power supply operatively connected to the at least one semi-active damper for selectively powering the at least one semi-active damper;

a recharging arrangement in electrical communication with the rechargeable power supply, the recharging arrangement being mounted to one of the base plate and the load plate and being configured for converting vibratory motion to electrical energy for storage in the rechargeable power supply; and an adaptive damper controller operatively connected to the at least one semi-active damper for controlling the reaction force applied to the load plate and the base plate, the damper controller comprising an optimum damper force determination module configured for determining from real time data the relative displacement of the load plate and a relative velocity of the load plate with respect to the base plate, for calculating first and second gain values and for calculating an optimum reaction force from the relative displacement, the relative velocity and the first and second gain values.

42. An isolation system according to claim 41 wherein the recharging arrangement includes an electrical coil, at least one spring and a magnet connected to the at least one spring, the magnet being disposed within the electrical coil so that oscillation of the magnet produces a current in the electrical coil.

43. An isolation system according to claim 41 wherein the at least one semi-active damper is a magnetorheological fluid damper.

44. An isolation system according to claim 41 wherein the at least one semi-active damper is an electrorheological fluid damper.

45. An isolation system according to claim 41 wherein the optimum damper force determination module is programmed for calculating an optimum reaction force $F_{Opt}$ using the equation $$F_{Opt} = G_1 X_{Rel} + G_2 V_{Rel}$$

where $X_{Rel}$ is the relative displacement between the load plate and the base plate, $V_{Rel}$ is the velocity of the load plate relative to base plate, $G_1$ is the first gain value and $G_2$ is the second gain value, the optimum damper force determination module being further programmed for calculating the first and second gain values based on an optimizable cost function.

46. An isolation system according to claim 41 wherein the optimum force determination module includes gain adjustment software configured for determining a change in mass of the equipment based on a change in steady state spacing between the load plate and the base plate and for adjusting at least one of the first and second gains based on the determined change in mass.

47. An isolation system according to claim 41 wherein the power supply is included in the damper controller.

* * * * *